(12) United States Patent
Durán (10) Patent No.: US 7,428,118 B2
(45) Date of Patent: Sep. 23, 2008

(54) LTM COMPENSATION METHODS AND SYSTEMS FOR MAGNETIC SERVO WRITING

(75) Inventor: Carlos A. Durán, Framingham, MA (US)

(73) Assignee: Quantum Corporation, San Jose, CA (US)

( * ) Notice: Subject to any disclaimer, the term of this patent is extended or adjusted under 35 U.S.C. 154(b) by 374 days.

(21) Appl. No.: 11/288,684

(22) Filed: Nov. 28, 2005

(65) Prior Publication Data

US 2007/0121240 A1     May 31, 2007

(51) Int. Cl.
*G11B 21/10*     (2006.01)
(52) U.S. Cl. ....................................... 360/75
(58) Field of Classification Search ............. None
See application file for complete search history.

(56) References Cited

U.S. PATENT DOCUMENTS

| | | | |
|---|---|---|---|
| 3,845,500 A | 10/1974 | Hart | |
| 4,616,275 A | 10/1986 | Peeters | |
| 5,371,638 A | 12/1994 | Saliba | |
| 5,384,671 A | 1/1995 | Fisher | |
| 5,389,671 A | 2/1995 | Felman et al. | |
| 5,452,165 A | 9/1995 | Chen et al. | |
| 5,576,906 A | 11/1996 | Fisher et al. | |
| 5,689,384 A | 11/1997 | Albrecht et al. | 360/77.12 |
| 5,898,533 A | 4/1999 | Mantey et al. | |
| 5,903,404 A | 5/1999 | Tsurumi et al. | |
| 5,930,065 A | 7/1999 | Albrecht et al. | 360/75 |
| 5,995,306 A | 11/1999 | Contreras et al. | |
| 6,018,434 A | 1/2000 | Saliba | |
| 6,021,013 A | 2/2000 | Albrecht et al. | 360/77.12 |

(Continued)

FOREIGN PATENT DOCUMENTS

| | | |
|---|---|---|
| EP | 0 690 442 A2 | 1/1996 |
| EP | 0 690 442 A3 | 1/1996 |
| EP | 0 690 442 B1 | 1/1996 |
| EP | 1 600 967 A2 | 11/2005 |

OTHER PUBLICATIONS

Abramovitch, D.Y. et al. (Jun. 1998). "Customizable Coherent Servo Demodulation for Disk Drives," *Proceedings of the American Control Conference* Philadelphia, PA, Jun. 24-26, 1998, 5:3043-3049.

Aziz, P. M. et al. (Nov. 2004). "Servo Signal Processing," Chapter 30 in *Coding and Signal Processing for Magnetic Recording Systems*, CRC Press Inc: Boca Raton, FL, pp. 30-1-30-12.

*Primary Examiner*—Andrew Sniezek
*Assistant Examiner*—James L Habermehl
(74) *Attorney, Agent, or Firm*—Morrison & Foerster LLP (57) ABSTRACT

Methods and systems are provided for writing a magnetic servo track. In one example, a system includes a head assembly having first and second write elements, and a controller. The controller operable to receive a position signal associated with a position of the magnetic storage medium and energize the first write element to write a first magnetic servo pattern (e.g., repeating servo frames including a tone field). The controller is further operable to energize the second write element to write a second magnetic servo pattern (e.g., a mid-frame mark) at least partially overlapping the first pattern, wherein the relative position of the second pattern is adjusted in response to the position signal. The second pattern may be displaced relative to the first pattern in response to a lateral displacement of the magnetic storage medium to maintain a desired center line condition of the servo track.

20 Claims, 6 Drawing Sheets

U.S. PATENT DOCUMENTS

| | | |
|---|---|---|
| 6,023,386 A | 2/2000 | Reed et al. |
| 6,031,671 A | 2/2000 | Ayres |
| 6,108,159 A | 8/2000 | Nute et al. |
| 6,111,719 A | 8/2000 | Fasen .................. 360/77.12 |
| 6,239,939 B1 | 5/2001 | Bui et al. ............... 360/77.12 |
| 6,246,535 B1 | 6/2001 | Saliba et al. |
| 6,266,204 B1 | 7/2001 | Nonoyama |
| 6,282,051 B1 | 8/2001 | Albrecht et al. ................ 360/75 |
| 6,320,719 B1 | 11/2001 | Albrecht et al. .......... 360/77.12 |
| 6,327,105 B1 | 12/2001 | DeForest |
| 6,462,904 B1 | 10/2002 | Albrecht et al. |
| 6,498,695 B2 | 12/2002 | Kosugi |
| 6,512,651 B1 | 1/2003 | Eifert et al. |
| 6,542,325 B1 | 4/2003 | Molstad et al. ................ 360/75 |
| 6,580,581 B1 | 6/2003 | Bui et al. |
| 6,657,802 B1 | 12/2003 | Ashley et al. |
| 6,710,967 B2 * | 3/2004 | Hennecken et al. ...... 360/77.12 |
| 6,721,126 B1 | 4/2004 | Bui et al. |
| 6,762,900 B2 | 7/2004 | Bui et al. ................ 360/77.12 |
| 6,775,092 B2 * | 8/2004 | Zweighaft et al. ........ 360/77.12 |
| 6,781,778 B1 | 8/2004 | Molstad et al. .......... 360/77.12 |
| 6,839,196 B2 | 1/2005 | Trivedi |
| 6,842,305 B2 | 1/2005 | Molstad et al. |
| 6,865,050 B2 * | 3/2005 | Nakao et al. ................. 360/75 |
| 6,879,457 B2 | 4/2005 | Eaton et al. |
| 6,912,104 B2 * | 6/2005 | Trabert et al. ............ 360/77.12 |
| 6,999,258 B2 | 2/2006 | Molstad et al. .......... 360/77.12 |
| 7,002,763 B2 | 2/2006 | Bui et al. ...................... 360/75 |
| 7,035,040 B2 | 4/2006 | Molstad et al. .......... 360/77.12 |
| 7,038,872 B2 | 5/2006 | Yip et al. ..................... 360/48 |
| 7,085,095 B2 | 8/2006 | Saliba et al. |
| 7,095,583 B2 | 8/2006 | Johnson et al. .......... 360/77.12 |
| 7,102,845 B2 * | 9/2006 | Saliba et al. .............. 360/77.12 |
| 7,102,847 B2 | 9/2006 | Bui et al. ...................... 360/75 |
| 7,116,514 B2 | 10/2006 | Mahnad et al. |
| 7,130,140 B1 * | 10/2006 | Boyer et al. ................... 360/48 |
| 7,136,255 B2 | 11/2006 | Mahnad et al. |
| 7,139,151 B2 | 11/2006 | Johnson et al. |
| 7,139,152 B2 | 11/2006 | Mahnad et al. |
| 7,149,050 B2 | 12/2006 | Saliba et al. |
| 7,158,338 B2 | 1/2007 | Koski et al. .............. 360/77.12 |
| 7,170,702 B2 | 1/2007 | Ohtsu |
| 7,245,453 B2 | 7/2007 | Koski et al. .............. 360/77.12 |
| 2002/0060968 A1 | 5/2002 | Senshu |
| 2002/0176200 A1 | 11/2002 | Trivedi |
| 2003/0016465 A1 | 1/2003 | Bui et al. |
| 2003/0043498 A1 | 3/2003 | Johnson et al. .......... 360/77.12 |
| 2003/0058562 A1 | 3/2003 | Kuki et al. |
| 2003/0123179 A1 | 7/2003 | Molstad et al. ................ 360/75 |
| 2003/0165029 A1 | 9/2003 | Molstad et al. |
| 2003/0167438 A1 | 9/2003 | Aziz |
| 2004/0223248 A1 | 11/2004 | Dugas et al. ................... 360/75 |
| 2005/0083600 A1 | 4/2005 | Mahnad et al. |
| 2005/0083601 A1 | 4/2005 | Mahnad et al. |
| 2005/0083602 A1 | 4/2005 | Saliba et al. |
| 2005/0088770 A1 | 4/2005 | Saliba et al. |
| 2005/0088776 A1 | 4/2005 | Saliba et al. |
| 2005/0094308 A1 | 5/2005 | Mahnad et al. |
| 2005/0259349 A1 | 11/2005 | Koski et al. .............. 360/77.12 |
| 2006/0044671 A1 | 3/2006 | Weber et al. |
| 2006/0126207 A1 | 6/2006 | Johnson et al. |
| 2007/0019316 A1 | 1/2007 | Norton, Jr. ..................... 360/29 |
| 2007/0064327 A1 | 3/2007 | Koski et al. ................... 360/75 |
| 2007/0070545 A1 | 3/2007 | Koski et al. ................. 360/134 |

* cited by examiner

Figure 5

LTM COMPENSATION METHODS AND SYSTEMS FOR MAGNETIC SERVO WRITING

BACKGROUND

1. Field

Various examples described herein relate generally to writing magnetic servo patterns to magnetic storage media, and in one aspect to position detection and servo writing control methods and systems for writing a servo track or pattern to a magnetic storage medium.

2. Related Art

Digital data-recording on tape remains a viable solution for storage of large amounts of data. Conventionally, at least two approaches are employed for recording digital information onto magnetic or optical recording tape. One approach calls for moving a recording medium past a rotating head structure that reads and writes user information from discontinuous transverse tracks. Interactive servo systems are typically employed to synchronize rotation of the head structure with travel of the medium. This method is generally referred to as "Helical Recording." Another approach is to draw the recording medium across a non-rotating head at a considerable linear velocity. This approach is sometimes referred to as longitudinal recording and playback.

Increased data storage capacity, and retrieval performance, is desired of all commercially viable mass storage devices and media. In the case of linear tape recording a popular trend is toward multi-channel movable head structures with narrowed recording track widths and read track widths so that many linear data tracks may be achieved on a recording medium of a predetermined width, such as one-half inch width tape. To increase the storage density for a given cartridge size the bits on the medium may be written to smaller areas and on a plurality of parallel longitudinal tracks.

In multi-head, multi-channel magnetic tape storage systems, random lateral tape motion ("LTM") is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Misregistration between the head and the data track can cause data errors during readback and data loss on adjacent tracks during writing.

Various techniques for increasing the track density on magnetic tape employ recording servo information on the tape to provide positioning information to a tape drive system during writing and/or reading processes. Some systems magnetically record a continuous track of servo information which is then read and used as a position reference signal. For example, a variety of techniques have been used including dedicated and embedded magnetic servo tracks, time and amplitude magnetic servo tracks, and the like. Other systems may interperse or embed servo information with user data. Exemplary tape drive systems and methods are described, for example, in U.S. Pat. Nos. 6,246,535, 6,108,159, 5,371,638, and 5,689,384, all of which are hereby incorporated by reference herein in their entirety.

Additionally, LTM is an important factor in the performance of servo writers, which record the servo pattern to the magnetic storage medium. LTM during the servo writing process may result in undesired lateral pattern motion ("LPM") of the servo pattern. LPM of the servo pattern generally has a detrimental effect on servo performance of the magnetic storage medium. Accordingly, LTM is generally minimized by controlling the path of the magnetic storage medium during the servo writing process; however, increased control of the path generally increases the mechanical complexity of the servo writer.

BRIEF SUMMARY

Methods and systems are provided for writing one or more magnetic servo tracks to a magnetic storage medium. In one example, a system comprises a head assembly comprising first and second write elements, the first and second write elements aligned along a direction of transport of the magnetic storage medium, and a controller. The controller is operable to receive a position signal associated with a position of the magnetic storage medium and energize the first write element to write a first magnetic servo pattern (e.g., repeating servo frames including a tone field) to the magnetic storage medium. The controller is further operable to energize the second write element to write a second magnetic servo pattern (e.g., a mid-frame mark) to the magnetic storage medium and at least partially overlapping the first magnetic servo pattern, wherein the second magnetic servo pattern is adjusted in response to the position signal. In one example, the second magnetic servo pattern is displaced in response to a lateral displacement of the magnetic storage medium to maintain a desired center line condition of the servo track.

In another example, a system comprises a head assembly including first and second write elements, a read element, a position sensor, and a controller. The controller is operable to energize the first write element to write a servo track comprising repeating servo frames, each servo frame having a tone field of repeating servo marks, receive a read signal generated from the read element in response to the servo track created by the first write element, receive a position signal associated with the position of the magnetic storage medium, and energize the second write element to write a mid-frame synchronization mark within the tone field of repeating servo marks in response to the read signal and the position signal. The mid-frame synchronization mark is positioned such that the number of servo marks in the tone field of the servo frame along a longitudinal direction of the servo track before the mid-frame synchronization mark and after the mid-frame synchronization mark varies with lateral position, and in one example, is equal at a lateral position associated with the center of the servo track.

In another aspect, a method for writing a servo track on a magnetic storage medium is provided. In one example, a method includes moving a magnetic storage medium in a longitudinal direction relative to a first write element and a second write element, wherein the first write element and the second write element are aligned along the longitudinal direction and are oriented at different azimuth angles. Current pulses are generated in the first write element and the second write element to write servo frames forming a servo track, wherein within each servo frame the first write element writes a tone field of repeating servo marks and the second write element overwrites a portion of the tone field with a synchronization mark. During the writing process, lateral displacement of the magnetic storage medium is determined (e.g., by one or more tape edge sensors), and the second synchronization mark is delayed or advanced such that the number of servo marks in the tone field of each servo frame along a center line of the servo track is approximately equal before and after the second synchronization mark (sometimes referred to herein as the mid-frame mark).

Servo patterns written as provided herein may provide a servo pattern scheme where the number of servo marks in the tone field of each servo frame along the longitudinal direction of the servo track before the mid-frame synchronization mark and after the mid-frame synchronization mark varies with lateral position.

Various aspects and examples of the present inventions are better understood upon consideration of the detailed description below in conjunction with the accompanying drawings and claims.

DETAILED DESCRIPTION

Various methods and systems for writing magnetic servo patterns to magnetic storage media are provided herein. The following description is presented to enable a person of ordinary skill in the art to make and use the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head with respect to a storage tape and data tracks within a tape drive during writing and reading processes is one of the main challenges in the area of magnetic storage tape systems. Generally, a closed loop servo system, deployed by the tape drive electromechanical system, utilizes an estimate of the relative position of the transducer head to the storage tape to align the transducer head to a data track position. Various examples described herein provide methods and systems for writing magnetic servo patterns with compensation for LTM during the writing process, thereby improving the quality of the servo pattern.

In one example provided herein, a magnetic servo track is recorded longitudinally along a magnetic storage medium. The servo track includes a periodic (e.g., repeating, but not necessarily identical) sequence of magnetic flux transitions forming a pattern of detectable servo marks (each period or repeating sequence of servo marks is referred to herein generally as a "servo frame"). In one example, each servo frame includes a tone field of repeating servo marks separated by a known distance and oriented at an azimuthal angle. Each servo frame additionally includes at least two uniquely identifiable features, referred to herein as synchronization marks, distinguishable from the tone field. The synchronization marks may include, for example, a servo mark or marks of varying spacing and/or azimuthal angle from the tone field. In another example, an identifiable feature may include an erased band of the tone field. In one example, the first synchronization mark (sometimes referred to as a "start-frame" mark) and tone field are oriented at the same angle and the second synchronization mark (sometimes referred to as a "mid-frame" mark) overwrites the tone field at a second angle, different than the tone field and first synchronization mark. The resulting pattern is such that when moving in the longitudinal direction, the number of servo marks in the tone field before and after the second or mid-frame synchronization mark of a periodic frame varies with the lateral position of the servo track.

In one exemplary servo writing method, which may compensate for LTM and reduce Lateral Pattern Movement (LPM) of the servo track, a first write element writes the tone field and first synchronization mark (e.g., a varying servo mark, erased/unmarked band, or the like to distinguish servo frames) at a first angle. A second write element writes the mid-frame synchronization mark, wherein a read element detects the tone field and first synchronization mark to assist in disposing the mid-frame synchronization mark within the servo frame (i.e., between adjacent first synchronization marks).

For example, a signal developed by the read element provides a sequence of pulses associated with the tone field and first synchronization marks. A controller, e.g., through suitable detection logic, identifies the pulse spacing of the tone field and the unique pulse spacing or other detectable characteristic of the synchronization mark and controls counters that measure the distance or time from the first synchronization mark to write the mid-frame mark at a desired distance position relative to the first synchronization mark. The timing and placement of the mid-frame mark may be delayed or advanced within each servo frame based on a sensed displacement of the storage medium such that the formed servo track maintains a substantially linear center of track position (where along the center of track position a substantially equal number of tone field marks are included within each servo frame before and after the mid-frame mark).

The exemplary servo tracks provide a suitable pattern to measure relative position of a magnetic storage medium to drive head by measuring dimensions between synchronization marks within a servo track. Exemplary methods and systems that may be used with a servo track written as described herein is described, for example, in co-pending U.S. patent application Ser. No. 10/854,078, entitled "SERVO TRACK HAVING PERIODIC FRAMES OF TONE FIELD AND EMBEDDED SYNCHRONIZATION MARKS," filed May 24, 2004, and which is hereby incorporated by reference as if fully set forth herein.

Figures 1A, 1B:
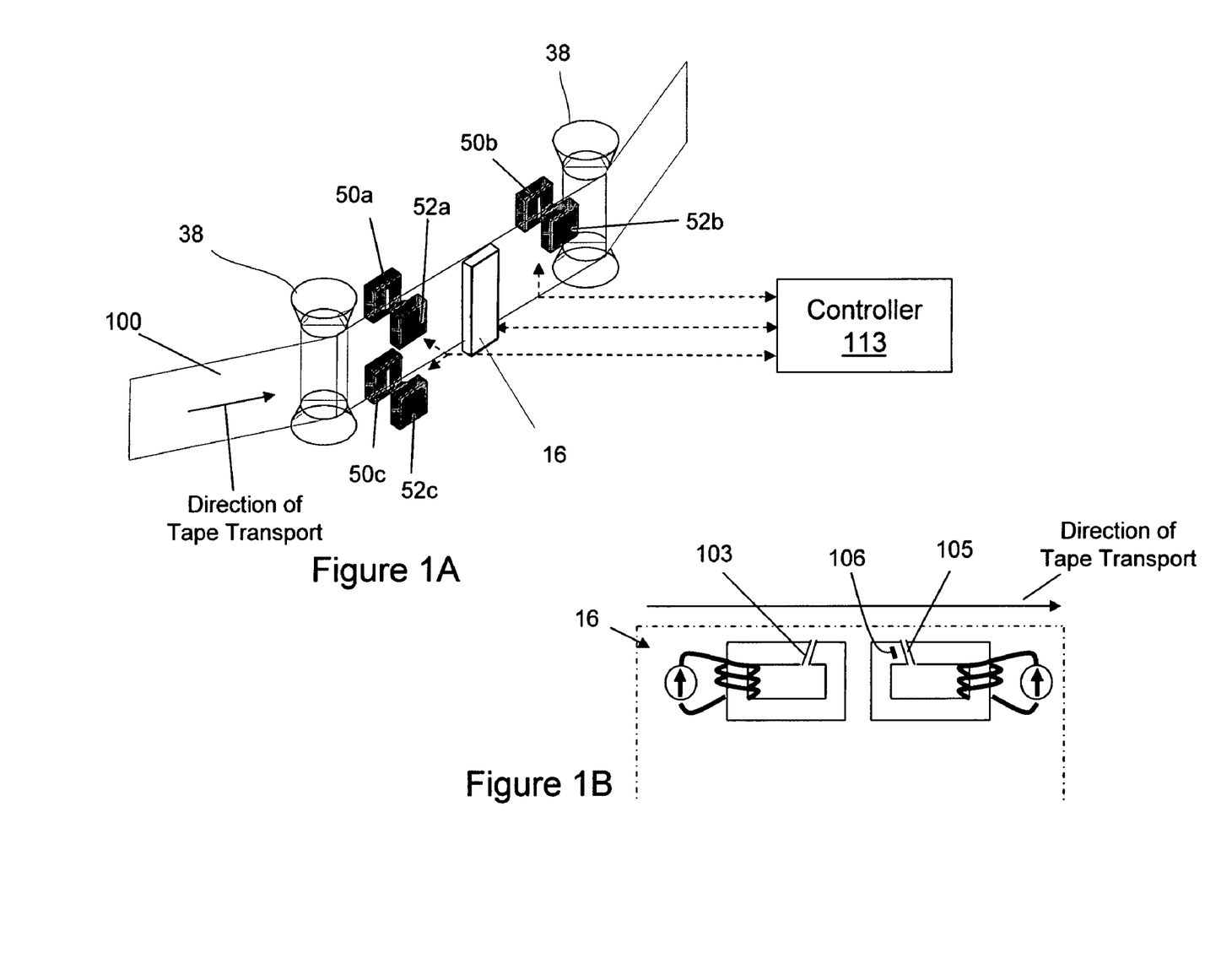
FIG. 1A illustrates a perspective view of an exemplary servo writing system.
FIG. 1B illustrates a conceptual drawing of a portion of an exemplary recording head according to the example of FIG. 1A.
Figure 2:
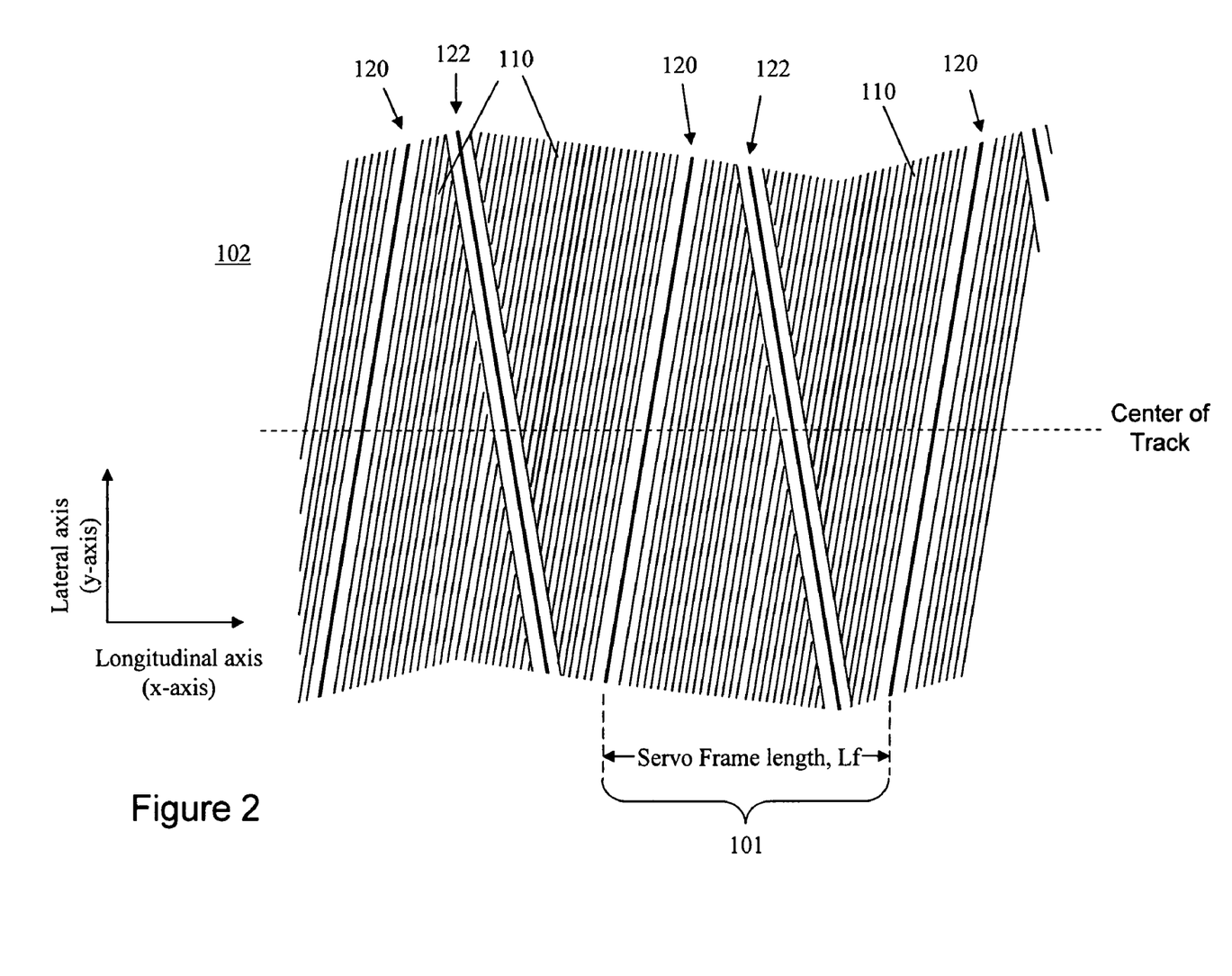
FIG. 2 illustrates an exemplary servo track pattern for providing positional information recorded via the exemplary system of FIG. 1A.

FIG. 1A illustrates a perspective view of an exemplary magnetic servo writing system, and FIG. 1B illustrates a conceptual illustration of a portion of a recording head used in the exemplary magnetic servo writing system of FIG. 1A. Additionally, FIG. 2 illustrates an exemplary servo track and is advantageously referenced in combination with FIGS. 1A and 1B.

The exemplary servo writing system and associated methods may sense lateral displacement of tape 100 while recording a magnetic servo track and adjust the recording on-the-fly to reduce or eliminate Lateral Pattern Motion (LPM) of the recorded servo track despite LTM of tape 100. The system generally includes head 16 and one or more position sensors 50a-50c in communication with a controller 113. Controller 113, e.g., the drive controller or the like, controls the operation of head 16 to write a servo track (e.g., track 102) in response to, at least in part, signals from one or more position sensors 50a-50c associated with the position of tape 100 and read element 106 associated with head 16. It will be recognized that head 16 and position sensor 50*a*-50*c* are shown without accompanying support structures, such as a head assembly or actuators for illustrative purposes.

In operation, tape 100 is guided by rollers 38 (or other guiding structures) positioned on either side of head 16. Positioned adjacent, and on either side of head 16, position sensors 50*a*-50*c* detect a reference associated with the relative position of the storage tape, e.g., a tape edge, magnetic/optical servo track, or the like. Position sensors 50*a*-50*c* generate a position signal associated with a lateral displacement of tape 100 during the writing process, which may be used to adjust the writing of mid-frame mark 122 relative to servo frame 101 and start-frame mark 120 as described herein. In this particular example, position sensors 50*a* and 50*b* are positioned to detect the upper edge of tape 100 on either side of head 16, and position sensor 50*c* is positioned to detect the lower edge of tape 100. In other examples, varying numbers of position sensors may be positioned along the direction of transport of tape 100 as well as on either or both vertical edges of tape 100. In some examples, it may be advantageous to position sensors 50*a*-50*c* in close proximity of head 16. Further, a plurality of sensors arranged to measure both tape edges before and after head 16 may be used to calculate LTM at the position of head 16 through various mathematical interpolation methods.

In one example, position sensors 50*a*-50*c* include optical sensors, e.g., CCD or CMOS sensors, light transmission sensors, or other suitable optical sensors for detecting an edge of storage tape 100. In one example, light sources 52*a*-52*c* and light sensors 50*a*-50*c* include commercially prepackaged source-sensor pairs, each pair including, e.g., a light emitting diode (LED) and a photodiode. One or more light sources, e.g., light sources 52*a*-52*c*, may be used to illuminate and image the edge of tape 100. Alternatively, one or more light sources 52*a*-52*c* may be positioned on the same side as sensors 50*a*-50*c* or be omitted. In other examples position sensors 50*a*-50*c* may include magnetic sensors or other track following optical sensors as are known in the art. Further, position sensors 50*a*-50*c* may be positioned to detect the top edge of tape 100, the bottom edge of tape 100, opposing edges of tape 100, and the like. Detecting both edges of tape 100 may allow for the determination of tape irregularities, e.g., damage or irregularities in the tape edge or width, which do not necessarily contribute to displacement of tape 100, or increase robustness of the system with regard to correlation of defects and offsets. Any number of edge sensors may be used to detect the position of one or both edges of tape 100. Additionally, a position sensor 50*a* or 50*b* may be positioned or configured to simultaneously detect both the top and bottom edge of tape 100, which may further allow controller 113 to determine tape irregularities, e.g., damage or irregularities in the tape edge or width.

In one example, light sources 52*a*-52*c* include coherent light sources, e.g., a laser diode or the like. Additional masks, optical elements, or filters may be used within the light path between light sources 52*a*-52*c* as will be recognized by those of ordinary skill in the art. For example, various filters, lenses, prisms, masks, and the like may be used. Additionally, light sources 52*a*-52*c* may emit various electromagnetic radiation and are not limited to visible light; for example, light sources 52*a*-52*c* may emit ultraviolet or infrared light. Position sensors 50*a*-50*c*, light sources 52*a*-52*c* (if included), may be mechanically fixed in a known physical relationship relative to the drive base and/or the head assembly (not shown).

In one example, read element 106 is disposed immediately adjacent write element 105. Head 16 may include a cluster of one or more write elements 105 bonded to a cluster of one or more read elements 106, or alternatively, write element 105 may include read element 106 fabricated at the same time, and on a shared magnetic flux shield with write element 105. The configuration of write elements and read elements produced at the same time, and on a shared shield is common in recording head fabrication methods.

In one example, the write element 103 has a magnetic gap that is oriented at an azimuth angle of, e.g., 9 degrees from the perpendicular to the longitudinal axis of the tape. The azimuth angle may range, e.g., between 0 and 20 degrees; of course, angles greater than 20 are possible. Write element 105 has a magnetic gap that is oriented at an azimuth angle different than the first, e.g., equal but opposite to the angle of the first head. The two heads therefore write flux transitions oriented at azimuth angles of equal magnitude but opposite sign or orientation from the transverse axis of the tape. In other examples, varying azimuthal angles (including zero) may be used for first and second write elements 103 and 105 to record the tone field, start-frame synchronization marks, and/or mid-frame synchronization marks.

A programmable pattern generator and pulse generator (not shown) may be used to create intermittent energizing of write element 103 to record tone field 110 and start-frame mark 120, defining a series of servo frames extending longitudinally along tape 100. For example, exemplary patterns may be recorded in suitable programmable memory and used to generate desired pulses. Additionally, patterns may be generated by a collection of suitable counters and associated logic as is well known in the art.

A read signal generated from read element 106 in response to the portion of servo track 102 recorded by write element 103 may be detected by suitable detection logic to provide a control signal to write element 105 for writing mid-frame synchronization mark 120 in servo frame 101 at a desired position, e.g., relative to tone field 110 and start-frame synchronization marks 120. Additionally, the timing and position of the mid-frame synchronization mark 122 may be adjusted based on a determination of relative displacement of tape 100 to write element 105.

In one example, a phase locked oscillator (PLO) may be used and locked to the pulses generated by tone field 110. The pulses may be counted from the beginning of each servo frame 101, e.g., after start-frame mark 120 is detected, to control the position for writing mid-frame mark 122. A PLO may provide greater accuracy for positioning the mid-frame mark 122 in the servo frame 101 by providing a multiple of PLO pulses for each tone field pulse, and by providing a position count signal that is responsive to the average of the detection of many tone pulses.

Additionally, controller 113 may adjust the timing of writing the second portion of servo track 102 (e.g., mid-frame marks 122) by write element 105 over the first portion (e.g., tone field 110) written by write element 103. The timing is adjusted, at least in part, in response to position signals received from position sensors 50*a*-50*c* associated with the relative position of tape 100. In this example (as seen clearly in FIG. 1B) head 16 includes at least two write elements 103 and 105 and one read element 106 aligned longitudinally (e.g., along the direction of tape transport). The first write element 103, oriented at a first azimuth angle, is controlled to write a portion of servo track including a series of servo frames comprising a tone field of repeating servo marks disposed at the first angle. The first write element 103 may also dispose a detectable start-frame synchronization mark at a desired frequency to demarcate repeating servo frames. The second write element 105, oriented at a second azimuth angle, non-parallel with the first azimuth angle, overwrites the tone field with a second or mid-frame synchronization mark. In one example, the mid-frame mark is desirably positioned within each servo frame such that the number of tone field marks before the mid-frame mark equals the number after the mid-frame mark along the center line of the track.

In particular, write element 103 writes a series of servo frames 101 comprising a tone field 110 and start-frame mark 120 to tape 100. Write element 105 overwrite tone field 110 with a second or mid-frame synchronization mark 122 at a second azimuth angle. The pattern generally includes "a center of track," defined by a path along servo track 102 at which each mid-frame mark 122 is approximately or exactly equidistant from the two neighboring synchronization marks 120 and has an equal number of tone field 110 marks before and after the mid-frame mark 122 (within the particular servo frame 101).

Read element 106, located adjacent write element 105 in this example, generates a read signal associated with start-frame mark 120 and tone field 110. The second synchronization mark 122 is written after a time T has elapsed from detection of the first synchronization mark 120; in this example, T is chosen to be half the delay between two adjacent start-frame marks 120. For a given lateral position within the servo track, a distance (x1) between the second synchronization mark 122 and the previous synchronization mark 120, and a distance (x2) between synchronization mark 122 and the following synchronization mark 120 may be determined via the tone field 110. The center of track is defined as the lateral position on the tape such that x1=x2.

In one example, for the ideal case of zero LTM during the servo writing process, the center of track is written parallel to the edge of tape 100, and remains at y=0 for the full length of servo track 102, e.g., remains at y=0 over multiple servo frames (where y is the relative position along the lateral axis). Non-zero LTM impacts the servo pattern in different ways depending on whether the motion takes place at write element 103 or at write element 105. LTM at the first write element 103 generally does not result in LPM, e.g., writing of tone field 110 and start-frame mark 120 (prior to writing mid-frame mark 122) does not define the center of track, but provides the basic timing along tape 100. It is noted, however, that LTM at write element 103 may impact the accuracy of the timing base; although the impact is generally small compared to other issues that affect timing.

LTM of tape 100 at the second write element 105 may result in LPM of the recorded servo track if the default timing of energizing write element 105 and writing mid-frame mark 122 is not adjusted. Accordingly, in one example, lateral displacement of tape 100, e.g., of a distance d, during the writing process is detected (e.g., from a position signal generated by one or more sensors 50a-50c) and controller 113 controls write element 105 to write mid-frame mark 122 at a longitudinal location such that x1=x2 at a lateral position given by d. For example, controller 113 adjusts the timing of energizing write element 105 (and therefore the position of mid-frame mark 122). The controller further receives a read signal(s) from tone field 110 (via read element 106), which provides a suitable timing base for positioning mid-frame mark 122 within servo frame 101. The lateral displacement d is thus written into the pattern to maintain a desired center of track (characterized generally as having equal number of servo marks before/after the mid-frame mark) despite LTM and movement of tone field 110, as indicated by the waviness of tone field 110 shown in FIG. 2.

An alternative (and equivalent) way of looking at the exemplary method for positioning mid-frame mark 122 includes that when tape 100 undergoes LTM, where tape 100 moves a lateral distance d, read element 106 adjacent write element 105 detects the first synchronization mark 120 with a longitudinal position error given by $\delta = d \tan \theta$. The mid-frame synchronization mark 122 is written with the longitudinal position error $\delta$, resulting in a local LPM equal to the lateral distance d. Note, the fact that the second synchronization mark 122 is written at a displaced position d does not generally impact the LPM of servo track 102 because the lateral location on the tape where x1=x2, is also displaced by a distance d. For example, the lateral location of the edges of the marks is not essential.

Accordingly, displacement of tape 100 (as detected by one or more sensors such as 50a-50c) may be used by controller 113 to determine a delay time $\tau$ for writing mid-frame synchronization mark 122. For example:

$$\tau = d \tan \theta / v \qquad \text{Equation 1}$$

where v is the tape speed, d is the lateral displacement and $\theta$ is the azimuth angle of the tone field 110 and synchronization mark 120. The delay is subtracted from the standard value of T (for zero lateral displacement), thereby compensating the timing error due to the lateral displacement d, and shifting back the center of track condition, x1=x2, to its "intended" position, y=0.

In one example, the exemplary servo writing methods and systems may be implemented without the need for additional moving parts (e.g., to move the head and/or tape during the writing process). The methods and systems may be particularly useful with a servo track having a tone field and synchronization marks as described herein. It is noted, however, that such methods and systems may be applied to other similar magnetic servo patterns not specifically described herein, as will be apparent to those of ordinary skill in the art. For example, exemplary methods described may be used with servo patterns including a synchronization mark written at an angle such that lateral displacements are associated with longitudinal displacements, and therefore can be compensated through a delay as described.

Figure 3A:
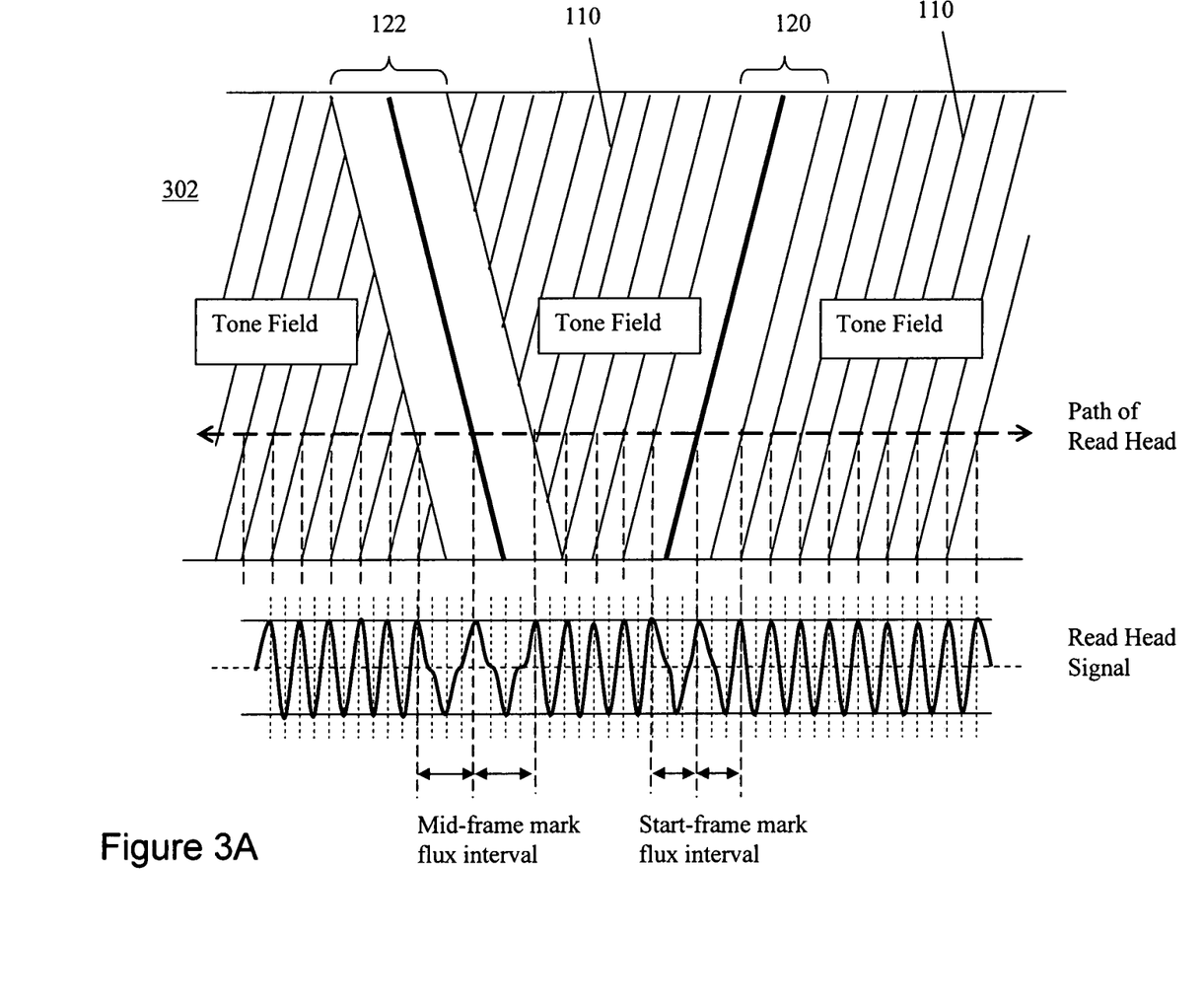
FIG. 3A illustrates an exemplary servo track, read head path, and associated read head signal generated from a portion of the servo track.
Figure 3B:
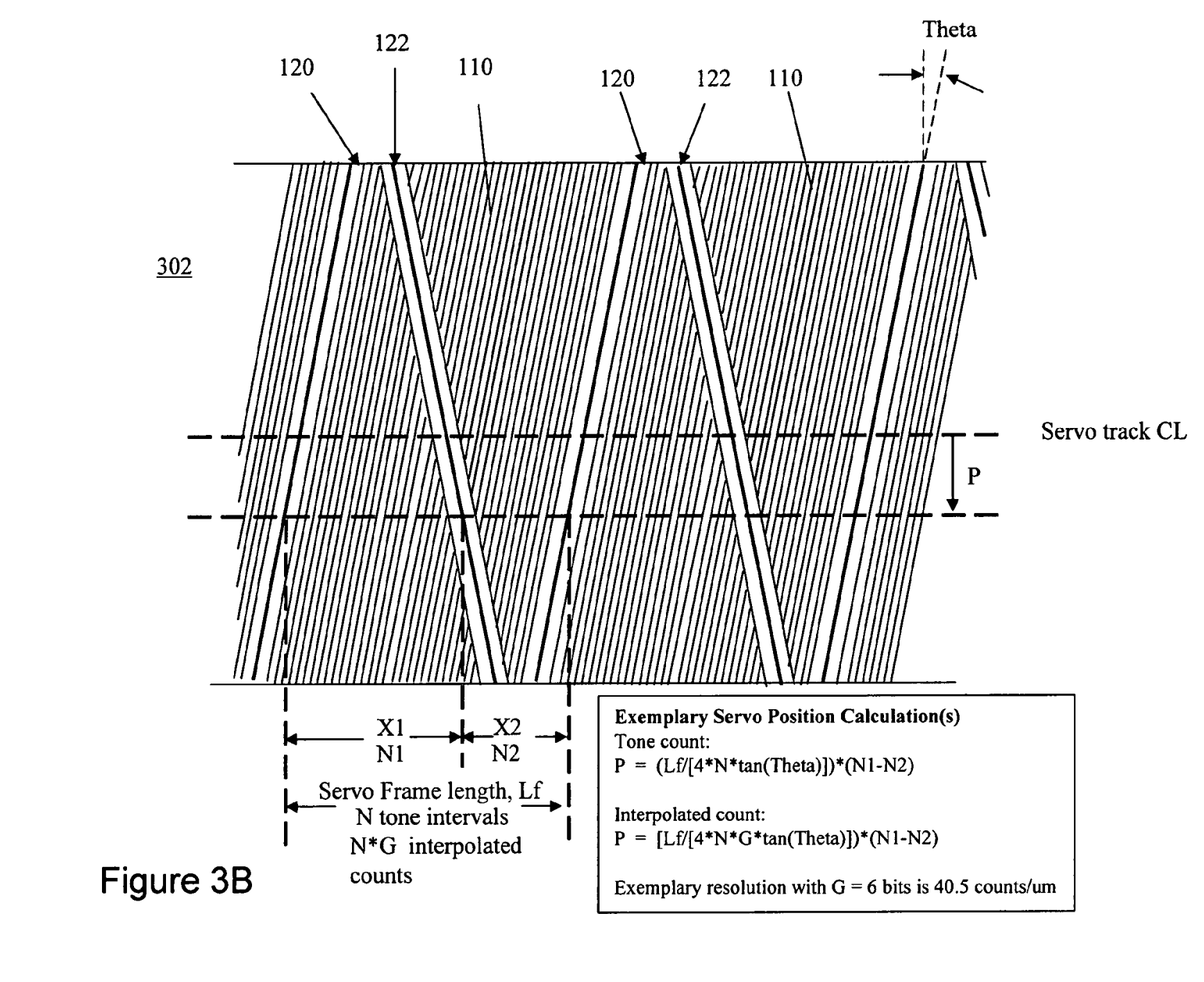
FIG. 3B illustrates an exemplary servo track position calculation from an exemplary servo track.

FIGS. 3A and 3B illustrate exemplary read signals and position calculations from an exemplary servo track 302 recorded, for example, by the exemplary systems and methods described with respect to FIGS. 1A, 1B, and 2. In particular, servo track 302 may be read by a transducer head of a media drive to provide detection of the lateral position of the transducer head relative to the servo track and magnetic storage tape. The drive servo system may adjust the position of the transducer head to the storage medium based on the position information. The exemplary read signals, calculations, and techniques described for detecting the servo pattern may also be similarly used with a read element (e.g., read element 106) during the servo writing processes as described.

Similar to that described with respect to servo track 102, servo track 302 includes periodic (e.g., repeating, but not necessarily identical) servo frames 101, with a length dimension, Lf, having tone field 110 and at least two dissimilar, yet identifiable synchronization marks 120 and 122. Additionally, at least one synchronization mark, e.g., synchronization mark 122, is embedded within tone field 110 and at a second azimuth angle such that the number of flux transitions in tone field 110 before and after synchronization mark 122 of each servo frame of length Lf varies with the lateral position within the servo track 302. In one example, the flux transitions of tone field 110 are spaced apart by known distances and thereby provide a direct measurement of distance along the length of the servo track 302, e.g., between successive synchronization marks 120 and 122. In this instance, synchronization mark 120 is oriented at the first azimuth angle, and is associated with the beginning or start of a servo frame 101, and synchronization mark 122 is associated with an intermediate point of the servo frame 101 (but not necessarily located at the physical center of servo frame 101), where a subsequent synchronization mark 120 indicates the end of the current servo frame 101, and the start of a new servo frame 101. In this manner each servo frame 101, is bounded at the start and end by synchronization marks 120, oriented at a first azimuth angle, between which is a tone field of a fixed number of flux transitions with constant spacing oriented at the first azimuth angle, and in which is embedded synchronization mark 122, oriented at a second azimuth angle. In other examples, an erased or unmarked band may generally define one or both servo marks.

A read transducer employed to detect the servo track 302 may have a width that is narrow relative to the servo track width, and such a transducer traces a thin line along the length of (and within) servo track 302 as it detects the flux transitions of the servo track. Along a line parallel to the center-line of servo track 302, and within servo track 302, the number of flux transitions in tone field 110 will vary before and after mid-frame synchronization mark 122 of each servo frame 101. For example, moving from left to right through the lower half of servo track 302, along this line, a greater number of flux transitions in tone field 110 of servo frame 101 occur before synchronization mark 122 than after synchronization mark 122. Conversely, through the upper half of servo track 302, a greater number of flux transitions in tone field 110 occur after synchronization mark 122 than prior to synchronization mark 122. By counting the number of flux transitions in tone field 110 in a servo frame 101 from start-frame synchronization mark 120 to the mid-frame synchronization mark 122, and by counting the number of flux transitions in the tone field 110 in the same servo frame from the mid-frame synchronization mark 122 to the next start frame synchronization mark 120, and by subtracting those counts, a relative lateral position of the read head to servo track 302 may be derived.

In this example, synchronization marks 120 and 122 are illustrated as magnetic flux transitions forming different identifiable marks similar to the servo marks of tone field 110, but varying in size, and synchronization mark 122 varying in azimuth angle. In other examples, one or more of synchronization marks 120 and 122 may include other features identifiable by a read head to demark servo frames and form a mid-frame synchronization mark such that the number of tone field servo marks before and after mid-frame synchronization mark 122 varies with lateral position. Such synchronization marks 120 and 122 may be formatted to enhance the detection of synchronization marks, to improve the resolution of the longitudinal position measurement while minimizing uncertainties arising from noise, signal distortion, and other detection channel characteristics.

FIG. 3A illustrates an exemplary path of a relatively narrow read transducer of a drive system along servo track 302 and the resultant read signal developed in the read head (shown below servo track 302). Tone field 110 provides a signal with a tone frequency proportional to longitudinal tape speed in the generated read signal and in which are embedded two unique synchronization marks 120 and 122 with distinct frequencies different from each other, and different from the tone signal frequency.

A suitable controller, e.g., including a suitable signal decoder or the like, identifies start-frame synchronization mark 120 by its unique flux spacing and the mid-frame synchronization mark by its unique flux spacing 122. The controller further determines the spacing between synchronization marks 120 and 122 by counting the number of flux transitions of tone field 110 there between, similar to that described with respect to the servo writing process.

In this example, the servo read head travels along servo track 302 and produces a continuous sequence of pulses as shown. A peak detection channel may process the read signal from the servo head. Additionally, the read head signal may be received by an analog front-end (AFE) chip and converted to numerical data by a suitable analog-to-digital converter and detection channel. The digital pulses or numerical data may then be processed by synchronization mark detection logic configured to detect intervals between pulses and identify those pulses associated with synchronization marks 120 and 122 and tone field 110. Alternatively, the digital pulses or numerical data may be processed by correlation detectors or maximum likelihood detectors to identify synchronization marks 120 and 122 and tone field 110. Various other methods of processing the read signal, e.g., analog or digital, to identify the features of servo track 302 will be apparent to those of ordinary skill in the art.

In one example, a one-micron interval identifies the tone-field pulses, and longer intervals identify the synchronization marks 120 and 122, e.g., a 2.0 micron interval identifies the mid-frame synchronization mark 122 and a 1.5 micron interval identifies the start-frame synchronization mark. Accordingly, the controller identifies synchronization marks 120 and 122 based on the relatively larger intervals of detected peaks in the synchronization mark signal differing from the relatively smaller intervals of detected peaks associated with the tone field 110.

Servo track 302 is read by a narrow servo read element (not shown) having a width of, e.g., 2 microns, along a read head path as shown. The width of the servo track spans several data track widths and may provide multiple index positions for reading and recording data tracks. In one example, the lateral width of servo track 302 is 94 microns and each written data track width is 10 microns such that 8 data track index positions are provided within the width of servo track 302.

With reference to FIG. 3B, an exemplary servo position calculation is described in detail, which may be carried out, e.g., by any combination of hardware, software, and firmware associated with a drive system. When the signal from tone field 110 and signals associated with synchronization marks 120 and 122 are identified, the position of the servo read head within servo track 302 may be determined. The distance from start-frame synchronization mark 120 to mid-frame synchronization mark 122, and the distance from mid-frame synchronization mark 122 to start-frame synchronization mark 120 of the next servo frame varies with the lateral position of the servo read head within servo track 302. As the servo read head moves downward in the servo track, the distance between start-frame synchronization mark 120 and mid-frame synchronization mark 122 increases, and conversely the distance between the mid-frame synchronization mark 122 and start-frame synchronization mark 120 of the next servo frame decreases. These two distances are measured by using tone field 110 as a metric reference, and the two distances provide information for computing lateral position of the servo read head relative to servo track 302.

In this example, when the servo read head is laterally positioned at the center of servo track 302, "Servo track CL," there is an equal distance and equal number of flux transitions of tone field 110 (or count pulses in the read signal) from the start-frame synchronization mark 120 to the mid-frame synchronization mark 122 as from the mid-frame synchronization mark 122 to the next start-frame synchronization mark 120. In one example, the value of the position signal may be set at zero for the servo track center CL.

For positions of the servo head above the centerline of the servo track, there are fewer count pulses, N1, from the start-frame synchronization mark 120 to the mid-frame synchronization mark 122 than from the mid-frame synchronization mark 122 to the next start-frame synchronization mark 120, N2. For these positions of the servo head, the calculation of head position will have a value that is negative. The computed head position decreases linearly from zero as the head position moves toward the upper edge of servo track 302.

For positions of the servo head below the centerline of the servo track, there are more count pulses, N1, from the start-frame synchronization mark 120 to the mid-frame synchronization mark 122 than from the mid-frame synchronization mark 122 to the next start-frame mark 120, N2. For these positions of the servo head, the calculation of head position will have a value that is positive. The computed head position increases linearly from zero as the head position moves toward the lower edge of servo track 302. In other exemplary computations, a zero reference point may include the top or bottom edge of servo track 302.

The position of the mid-frame synchronization mark 122, as detected by a read head within the servo frame 101, advances toward the beginning of servo frame 101 as the servo head moves upward in the servo track 302, and mid-frame synchronization mark 122 retreats away from the beginning of the servo frame 101 as the servo head moves downward in the servo track 302. It will be recognized by those of ordinary skill in the art that the description depends in part on the frame of reference and relative motion of the read head, servo track, and the like.

The relationship between lateral distance, P, of the head from the centerline of servo track 302 and the distance between start-frame synchronization mark 120 to mid-frame synchronization mark 122, X1, and mid-frame synchronization mark 122 to the next start-frame synchronization mark 120, X2, is given in Equation 2, where the azimuth angle of the two marks to the transverse axis is Theta.

$$P = [1/(4*\tan(\text{Theta}))]*(X1-X2) \qquad \text{Equation 2}$$

The dimensions, X1 and X2, are measured by employing the following equations and methods. In one example, the length of the interval between tone field pulses is 1 micron. The number of tone field pulses from the start-frame synchronization mark 120 to the mid-frame synchronization mark 122, N1, is counted, and the number of pulses in the tone field from the mid-frame synchronization mark 122 to the start-frame synchronization mark 120 of the next servo frame 120, N2, is counted. In this example, the distance from the start-frame synchronization mark 120 to the tone field is 1.5 microns, and the distance from the mid-frame synchronization mark 122 to the tone field is 2.0 microns. X1 and X2 are calculated from these parameters, and Equation 2 is solved for P as follows.

$$X1 = (N1+2.5) \text{ microns} \qquad \text{Equation 3}$$

$$X2 = (N2+2.5) \text{ microns} \qquad \text{Equation 4}$$

$$P = (1/[4*\tan(\text{Theta})])*(N1-N2) \text{ microns} \qquad \text{Equation 5}$$

In one example, the length of the tone interval is not 1 micron, but is such that a fixed number of tone intervals N, equals the length of the servo frame Lf. In this example the distance from the start-frame mark 120, to the tone field is Xsf, and the distance from the mid-frame mark 122, to the tone field is Xmf. The dimensions X1 and X2, in this case are measured by counting the number of tone field pulses N1, from start-frame mark 120, to mid-frame mark 122, and counting the number of tone field pulses N2, from mid-frame mark 122, to the start-frame mark of the next servo frame. X1 and X2 are calculated from these parameters, and Equation 1 is solved for P as follows.

$$X1 = Lf/N*(N1-1) + Xsf + Xmf \qquad \text{Equation 6}$$

$$X2 = Lf/N*(N2-1) + Xsf + Xmf \qquad \text{Equation 7}$$

$$P = (Lf/[N*4*\tan(\text{Theta})])*(N1-N2) \qquad \text{Equation 8}$$

In one example, X1 and X2 are measured with increased resolution by computing dimension intervals between the tone field and the synchronization marks to values represented by integral plus fractional parts of the tone interval. The fractional part of the tone interval is represented by a number, which may vary between zero and a maximum value, G. The length of the tone interval is such that a fixed number of tone intervals, N, equals the length of the servo frame, Lf. Represented in dimensional units of 1/G times the tone flux interval, the length of a full tone interval is equal to G and the length of the servo frame is N*G. To compute the values of X1 and X2 in Equation 2, accumulators are employed to add dimension intervals beginning at the start-frame mark 120 and ending at the mid-frame mark 122, and likewise beginning at the mid-frame mark 122 and ending at the start-frame mark 120 of the next servo frame. The value of G is added to an accumulator when a tone pulse is detected. When a synchronization mark is detected, the interval between the tone field and the synchronization mark, which is a number greater than G, is added to the accumulator. If the flux transition spacing of the start-frame mark is 1.5 times the flux transition spacing of the tone field, then the value added to the accumulator for the start-frame mark is 1.5*G. The interval between the tone field and the mid-frame mark varies with lateral position of the servo read head, and is bounded by the flux interval of the mid-frame mark 122 and the sum of the flux intervals of the tone field 110 and mid-frame mark 122. When the mid-frame mark 122 is detected, the distance between the tone field and the mid-frame 122 mark is computed and is a number greater than G, representing the distance in integral plus fractional parts of the tone field interval. If the mid-frame mark flux interval is 2 times the tone flux interval, then the value of the interval between tone field 110 and mid-frame mark 122 is bounded between 2*G and 3*G, and this value is added to the accumulator. The resolution of the linear dimensions computed by the accumulators is Lf/N*G, the value of the accumulator which sums the dimensions from the start-frame mark 120 to the mid-frame mark 122 is N1 and the value of the accumulator which sums the dimensions from the mid-frame mark to the start frame mark of the next servo frame is N2. X1 and X2 are measured in this manner, and Equation 2 is solved for P as follows.

$$X1 = (Lf/N*G)*N1 \qquad \text{Equation 9}$$

$$X2 = (Lf/N*G)*N2 \qquad \text{Equation 10}$$

$$P = (Lf/[N*G*4*\tan(\text{Theta})])*(N1-N2) \qquad \text{Equation 11}$$

In one example, X1 and X2 are measured with increased resolution by employing a high frequency pulse generator that is phase locked to the tone field pulses. The pulse generator multiplies the number of pulses generated by the tone field, and is commonly referred to as a phase-locked oscillator, or PLO. The PLO produces a fixed number of pulses, G, for each pulse of the tone field, and generally provides these pulses to a counter with finer position resolution than the tone field. The PLO also provides pulses for counting continuously through the synchronization mark regions. The distance between the servo frame synchronization marks may be measured more accurately and with finer resolution by counting PLO pulses between synchronization marks, and without adding the distance from the start-frame synchronization mark 120 to the tone field (in this example, 1.5 microns) and from the mid-frame synchronization mark 122 to the tone field (in this example, 2.0 microns).

In one example, the dimensions, X1 and X2, are measured with a PLO by employing the following equations and methods (which may be similarly used for detecting the tone field pulses and positioning they mid-frame mark during the servo writing process). The length of the servo frame Lf, is known, and the length of the interval between tone field pulses, Xtone, is also known, e.g., 1 micron. The total number of tone pulse intervals between successive start-frame synchronization marks 120, N, is constant and equal to Lf/Xtone. The total number of PLO pulses in a servo frame is a constant, N*G, and the length interval represented by each PLO pulse is Lf/(N*G). The number of PLO pulses from the start-frame synchronization mark 120 to the mid-frame synchronization mark 122, N1, is counted, and the number of PLO pulses from the mid-frame synchronization mark 122 to the start-frame synchronization mark 120 of the next servo frame, N2, is counted.

The value, N1, represents the distance in PLO pulse intervals between the start-frame synchronization mark 120 and the mid-frame synchronization mark 122. The value, N2, represents the distance in PLO pulse intervals between the mid-frame synchronization mark 122 and the start-frame synchronization mark 120 of the next servo frame 120. X1 and X2 are calculated from these parameters, and Equation 1 is solved for P as follows.

$$X1 = (Lf/[N*G])*N1 \qquad \text{Equation 12}$$

$$X2 = (Lf/[N*G])*N2 \qquad \text{Equation 13}$$

Substituting the values from Equations 11 and 12 into Equation 2 yields $$P = (Lf/[4*N*G*\tan(\text{Theta})])*(N1-N2) \qquad \text{Equation 14}$$

The above solution for the lateral position of the servo head in the servo track arises from distance measurements and general principles of geometry. The variables are measured distances represented by the values N1 and N2. The position of the servo head is solved by subtracting N2 from N1 and multiplying by a constant. The parameters, Lf, N, Theta, and G are constants determined by the geometry of the servo track and the multiplication factor of the PLO. Accordingly, the solution for lateral servo head position is independent of variables such as tape speed and other time dependent parameters. The resolution to which lateral position is computed is determined by selecting values for Lf, N, G, Theta, and the length of the tone flux change interval along the longitudinal axis of tape. The resolution may be further improved by accumulating the measurements of N1 and N2 over multiple servo frames.

In one example useful during servo writing and/or reading, the PLO maintains phase-lock to the average phase of the tone field 110 throughout the complete servo frame Lf. The dynamic response of the PLO is constrained to allow high frequency variations in the phase error signal without losing phase lock and while tracking normal motion-induced phase variations. The flux transition spacing intervals of the start-frame synchronization mark 120 and mid-frame synchronization mark 122 are selected to provide an integral number of tone-field intervals across these marks thereby allowing the PLO to transition the marks without disturbance. Alternatively, the phase error of the PLO can be sampled during intervals when the tone field is being detected, and held constant during synchronization mark detection.

Additionally, one exemplary method reduces or removes amplitude sensitivity in deriving the track following position signal by providing a continuous read signal, without gaps or intervals when no read signal is present in the detection channel. Since the servo track continuously provides flux transitions that are detected by the servo read head, a continuous read signal is available for detection to produce a continuous pulse sequence. The continuous read signal enhances signal processing, providing highly reliable signal amplitude regulation. There are no gaps in the pulse data stream that must be detected and handled by the system, and which make the detection channel susceptible to noise sources during the time intervals when gaps in the data stream are present. For example, a suitable tone field provides a method for maintaining a detection channel with a minimum or reduced bandwidth. The tone field thus reduces noise by minimizing the channel bandwidth, and maximizing the out-of-band noise rejection. Additionally, the tone field may provide a detection channel signal rich in amplitude peaks for controlling an automatic gain control system. Furthermore, position resolution may be enhanced by a pulse multiplication ratio of an oscillator phase locked to the tone field pulses in the servo track, or by other length interpolation methods.

Implementation of various aspects of the exemplary methods and systems may utilize simple pulse detection and logic circuits as will be recognized by those of ordinary skill in the art, and may be embodied in one or more of software, firmware, and hardware associated with a storage system or media drive system. Further, the exemplary methods and systems used to read the exemplary servo track pattern are equally applicable to the description of the read element used with the exemplary servo writer system and methods for detecting the first synchronization mark and tone field to time the placement of the second synchronization mark.

Figure 4:
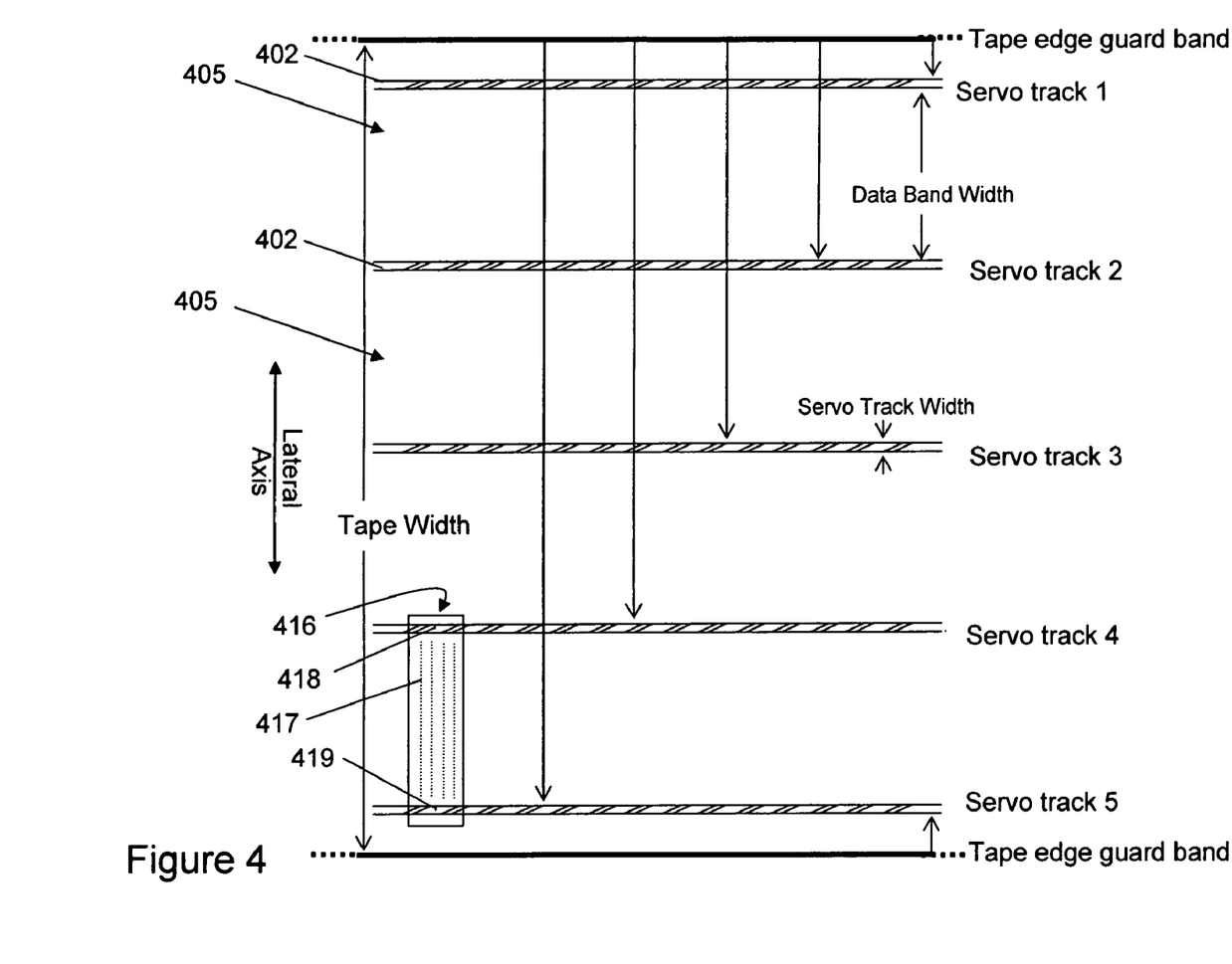
FIG. 4 illustrates an exemplary pattern of servo tracks on a magnetic storage medium.

FIG. 4 illustrates multiple servo tracks recorded longitudinally on a storage tape according to one example. Servo tracks 402 are spaced apart laterally to form multiple regions for data bands 405 separated by servo tracks 402. Also illustrated is an exemplary data recording head 416 including a set of write elements and read elements in a data head cluster 417 configured to record and read data tracks between adjacent sets of servo tracks 402. Data head cluster 417 may include dedicated servo read elements 418 and 419 disposed laterally, at the outermost positions of the cluster, configured over servo tracks 402. Servo read elements 418 and 419 may simultaneously read and provide position information from two adjacent servo tracks 402 while data is transferred to and from data band 405. In other examples, a data head 416 may include a single dedicated servo read element 418 displaced laterally, or intermittently translate to read an adjacent servo track 400 with a read element in data head cluster 417 and return to data tracks within data band 405 to continue reading or writing.

Signals from head 416 corresponding to servo elements 417 and 418 may be received by a signal decoder and detector logic as described previously to determine positional information. Head 416 may further be coupled to a head assembly and actuator, which in response to the positional information, translates head 416 to a desired lateral position with respect to servo track 400 and the magnetic storage medium.

In this example, track following misregistration (TMR) error may be relatively small compared to conventional methods because servo position heads may be included within the data head element cluster. Thus, TMR errors may be reduced to photolithographic tolerances and thermal expansion properties of the head and storage tape.

The exemplary servo track format of FIG. 4 includes five servo tracks 402 bounding four data bands 405 across the lateral dimension of tape. In this example, servo track 405 has a width of 94 μm and data band 405 has a width of 2700 μm. The servo track format, positions, and dimensions are illustrative only; any size, number, and configuration of servo tracks 402 and data bands 405 are contemplated to accommodate various storage systems and desired cartridge data capacity.

In one example, the position signal derived from the exemplary servo track and position detection method described is applied in a track following system for writing and reading multiple data tracks recorded longitudinally in data bands along side a servo track, between adjacent pairs of servo tracks, or distributed in regions separated by multiple servo tracks. To derive a position error signal useful for data track following, the digital position signal derived from the position computation as described, is subtracted from a reference position for the desired data track position. Accordingly, the width of each servo track spans multiple data track widths and includes multiple index and reference positions associated with data tracks of the databand.

In one example, servo tracks 402 are written individually with a write current driver dedicated to each servo track, which allows information unique for each servo track to be encoded into the longitudinal data field for that track. Examples of such unique information include the servo track identification number, servo track calibration information, and the like.

Figure 5:
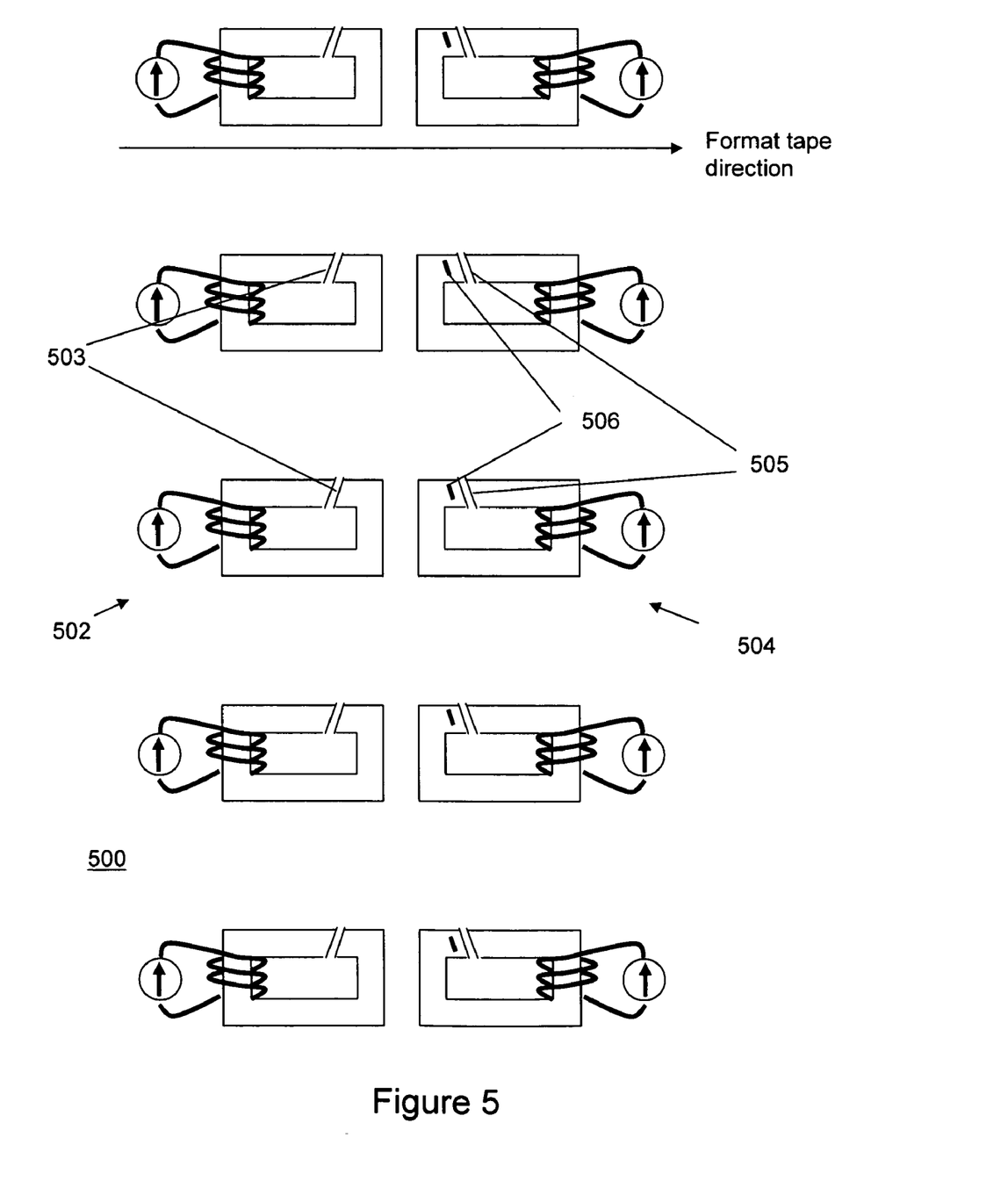
FIG. 5 illustrates an exemplary write head for recording multiple servo tracks to a magnetic storage medium.

FIG. 5 illustrates a conceptual drawing for the configuration of a format head 500 that may write multiple servo tracks 402 as illustrated in FIG. 4. In one example, the first write head cluster 502, having multiple write elements 503, writes multiple servo tracks (e.g., 5 servo tracks) simultaneously, with constant frequency tone and with embedded start-frame synchronization marks spaced at the servo frame interval Lf. The flux transitions are recorded at a first azimuth angle to the transverse axis of the tape. The second write head cluster 504, having multiple write elements 505, periodically overwrites the tracks written by the first head cluster 502 and creates the mid-frame synchronization marks. Write elements 505 have geometry to create flux transitions at a second azimuth angle, different than the first write head elements 503. Write elements 505 may include read transducers 506 to detect the flux transitions written by the write elements 503 for the purpose of accurately placing the mid-frame synchronization marks relative to tone and start-frame synchronization marks written by write elements 503. It should be noted that any number of first write head elements 503 and second write head elements 505, including one of each, are contemplated for formatting a tape with servo tracks.

The position in the servo frame where the mid-frame synchronization marks are written by the second write heads of cluster 504 are controlled to accurately place the mid-frame synchronization marks relative to the tone field and start-frame synchronization marks written by the first write head cluster 502. One exemplary method to accurately place the mid-frame synchronization marks in the servo frames of each servo track employs read transducers 506 immediately adjacent to each of the write elements 505. Write head cluster 504 may be bonded to a read head cluster including read transducers 506, or alternatively, write elements 505 may include read transducers 506 fabricated at the same time, and on a shared magnetic flux shield with the write elements 505. In one example, the location for read transducers 506 is in close proximity to write elements 505, and positioned between write elements 503 and 505.

The configuration of write and read transducers produced at the same time, and on a shared shield is common in recording head fabrication methods. With this configuration, transducers 506 read the tone field and start-frame synchronization marks written by the first write elements 503 as they arrive at the write elements 505. The read signals for each servo track are detected by suitable detection channels, and provide separate control signals to each of the write elements 505 to accurately place the mid-frame synchronization marks in the servo frames, relative to the tone and start-frame synchronization marks of those servo frames. Additionally, the timing and position of the mid-frame synchronization mark may be adjusted based on a determination of relative displacement of the magnetic storage medium and write elements 505 as described. In this manner each servo track with a pattern of tone and start-frame synchronization marks written by write elements 503 is separately read at each of the write elements 505 to accurately and independently place the mid-frame synchronization marks in the servo frames of the separate servo tracks.

The signals from read transducers 506 may be detected in suitable detection channels to detect the start-frame marks and tone field pulses. When a start-frame mark is detected, a number of tone pulses may be counted to the position in the servo frame where the mid-frame mark is written. When the specific number of tone pulses is counted, write elements 505 may be energized to write the mid-frame mark at that position. Alternatively, the pulses of a phase locked oscillator, PLO, that is locked to the tone field may be counted after the start-frame mark is detected to control the position for writing the mid-frame mark. The PLO may provide greater accuracy for positioning the mid-frame mark in the servo frame, by providing a multiple of PLO pulses for each tone pulse, and by providing a position count signal that is responsive to the average of the detection of many tone pulses.

The cluster of write elements 503 and 505 may be fabricated on a single wafer with conventional head fabrication techniques. Single wafer fabrication techniques may increase the precision and alignment by which multiple servo tracks are written to the storage tape. The write elements 503 and 505 are thereby aligned both longitudinally and laterally through fabrication.

A programmable pattern generator and pulse generator may be used to create intermittent energizing of selective write elements 503 and 505 to record one or more desired servo tracks. Exemplary patterns may be recorded in suitable programmable memory and used to generate desired pulses. Additionally, patterns may be generated by a collection of suitable counters and associated logic as is well known in the art.

Additional aspects, e.g., determining the velocity of the tape from the tone field, providing a clock for data channels, and encoding information within the tone field are possible and described in copending U.S. patent application Ser. No. 10/854,078, entitled "SERVO TRACK HAVING PERIODIC FRAMES OF TONE FIELD AND EMBEDDED SYNCHRONIZATION MARKS," and filed May 24, 2004, which is hereby incorporated by reference as if fully set forth herein.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A system for writing a magnetic servo track to a magnetic storage medium, the system comprising:
   a head assembly comprising first and second write elements, the first and second write elements aligned along a direction of transport of the magnetic storage medium relative to the head assembly; and
   a controller, the controller operable to:
   receive a position signal associated with a position of the magnetic storage medium, wherein the position signal is generated by at least one sensor positioned to detect an edge of the magnetic storage medium,
   energize the first write element to write a first magnetic servo pattern to the magnetic storage medium, and
   energize the second write element to write a second magnetic servo pattern to the magnetic storage medium and at least partially overlapping the first magnetic servo pattern, wherein the second magnetic servo pattern is shifted in response to the position signal.

2. The system of claim 1, wherein the at least one sensor includes an optical sensor.

3. The system of claim 1, wherein the controller is further operable to receive a read signal from a read element associated with the first magnetic servo pattern.

4. The system of claim 3, wherein the act of energizing the second write element includes detecting a characteristic of the read signal and energizing the second write element after a time period, the time period offset based on the received position signal.

5. The system of claim 1, wherein the first and second write elements are oriented at different azimuth angles.

6. The system of claim 1, wherein the controller is further operable to energize the first write element to write a tone field of repeating servo marks and a series of first identifiable marks distinguishable from the tone field, the tone field and the first identifiable marks having a first azimuth angle.

7. The system of claim 6, wherein the controller is further operable to energize the second write element to write a series of second identifiable marks distinguishable from the tone field, the series of second identifiable marks disposed between adjacent first identifiable marks and oriented at a second azimuth angle.

8. The system of claim 7, wherein the series of second identifiable marks are disposed between adjacent first identifiable marks such that the number of servo marks of the tone field before the second identifiable mark and after the second identifiable mark are substantially equal along a center of the servo track.

9. A magnetic servo writer system comprising:
   a head assembly including first and second write elements and a read element;
   a position sensor; and
   a controller, the controller operable to
   energize the first write element to write a servo track comprising repeating servo frames, each servo frame having a tone field of repeating servo marks,
   receive a read signal generated from the read element in response to the servo track created by the first write element,
   receive a position signal associated with the position of the magnetic storage medium, and
   energize the second write element to write a mid-frame synchronization mark within the tone field of repeating servo marks in response to the read signal and the position signal, wherein the mid-frame synchronization mark is distinguishable from the tone field, and the number of servo marks in the tone field of the servo frame along a longitudinal direction of the servo track before the mid-frame synchronization mark and after the mid-frame synchronization mark varies with lateral position.

10. The system of claim 9, wherein the servo track includes a center of track defined by a lateral position where the number of servo marks in the tone field of the servo frame before the mid-frame synchronization mark and after the mid-frame synchronization mark are equal, and the center of track is substantially linear in a longitudinal direction over the repeating servo frame.

11. The system of claim 9, wherein the controller is further operable to time the act of energizing the second write element based on the position signal and the read signal.

12. The system of claim 9, wherein the act of energizing the second write element is offset from a predetermined timing in response to the position signal indicated a lateral displacement of the magnetic storage medium.

13. The system of claim 9, wherein the first and second write elements are disposed with different azimuth angles.

14. The system of claim 9, wherein the first and second write elements and read element are aligned longitudinally along a direction of transport.

15. A method for writing a longitudinal servo track on a magnetic storage medium, comprising:
   moving a magnetic storage medium in a longitudinal direction relative to first and second write elements, wherein the first and second write elements are aligned along the longitudinal direction and oriented at different azimuth angles;
   generating pulses in the first write element to write a servo track comprising a servo frame of magnetic flux transitions forming a detectable tone field of repeating servo marks;
   detecting a lateral position of the magnetic storage medium; and
   generating pulses in the second write element to overwrite a portion of the tone field with a mid-frame synchronization mark, wherein the number of servo marks in the tone field of the servo frame along a longitudinal centerline of the servo track before the mid-frame synchronization mark and after the mid-frame synchronization mark is approximately equal.

16. The method of claim 15, further comprising generating a read signal associated with the tone field to provide a timing base for writing the mid-frame synchronization mark.

17. The method of claim 16, wherein the mid-frame synchronization mark is adjusted based on the lateral position of the storage medium to reduce lateral displacement of the centerline of the servo track.

18. The method of claim 15, wherein the first recording element writes a start-frame synchronization mark associated with a beginning of each servo frame.

19. The method of claim 18, wherein at least one of the mid-frame synchronization mark and the start-frame synchronization mark includes a servo mark distinguishable from the tone field.

20. The method of claim 18, wherein at least one of the mid-frame synchronization mark and the start-frame synchronization mark include an erased region of the servo track.

* * * * *